T. C. PARSONS.
BALANCE BOOK AND SUPPLIES FOR USE THEREWITH.
APPLICATION FILED AUG. 25, 1920.

1,364,408.

Patented Jan. 4, 1921.
5 SHEETS—SHEET 1.

T. C. PARSONS.
BALANCE BOOK AND SUPPLIES FOR USE THEREWITH.
APPLICATION FILED AUG. 25, 1920.

1,364,408.                                                                 Patented Jan. 4, 1921.
5 SHEETS—SHEET 2.

Fig. 1A

AGENCY AT CHICAGO ILL.

RECAPITULATION

| | GROSS PREMIUMS DR | % COMS. | GROSS COMMISSIONS CR | |
|---|---|---|---|---|
| GROSS PREMIUMS PER ABSTRACT | | | | GROSS COMMISSIONS |
| | 310 00 | @ 15% | 46 50 | |
| | 211 25 | @ 20% | 42 25 | |
| | 183 75 | @ 25% | 45 94 | |
| | 186 25 | @ 30% | 55 88 | |
| TOTAL GROSS PREMS. | 891 25 | | 190 57 | TOTAL GROSS COMS. |
| RETURN PREMIUMS PER ABSTRACT | | | | RETURN COMMISSIONS |
| | 3 50 | @ 15% | | 53 |
| | 35 50 | @ 20% | | 7 10 |
| | 50 00 | @ 25% | | 12 50 |
| | 17 50 | @ 30% | | 5 25 |
| DEDUCT TOTAL RETURN PREMIUMS | 106 50 | | 25 38 | DEDUCT TOTAL RETURN COMS. |
| TO NET PREMIUMS | 784 75 | | 165 19 | BY NET COMMISSIONS |
| TO BAL. DUE AGENT | | | 619 56 | BY BALANCE DUE CO. |
| (MEMO. FOR CHGO. OFFICE ONLY) TO BAL. DUE AGT. NEXT ACCT. | | | | (MEMO. FOR CHGO. OFFICE ONLY) BY BAL. DUE AGT. LAST ACCT. |
| (MEMO. FOR CHGO. OFFICE ONLY) BAL. DUE CO. LAST ACCT. | | | | (MEMO. FOR CHGO. OFFICE ONLY) BAL. DUE CO. NEXT ACCT. |
| | | | | |
| TOTAL | | | | TOTAL |

Witnesses
J. W. Angell
Charles Hills Jr.

Inventor
Theodore C. Parsons
by Charles Hill
Atty.

T. C. PARSONS.
BALANCE BOOK AND SUPPLIES FOR USE THEREWITH.
APPLICATION FILED AUG. 25, 1920.

1,364,408.

Patented Jan. 4, 1921.

AGENCY AT No. 1 CHICAGO, ILL.

RECAPITULATION

| | GROSS PREMIUMS | | % COMS. | GROSS COMMISSIONS | | |
|---|---|---|---|---|---|---|
| | DR | | | CR. | | |
| GROSS PREMIUMS PER ABSTRACT | 500 | 00 | @ 15% | 75 | 00 | GROSS COMMISSIONS |
| " " | 800 | 00 | @ 20% | 160 | 00 | " " |
| " " | 900 | 00 | @ 25% | 225 | 00 | " " |
| " " | 1000 | 00 | @ 30 | 300 | 00 | " " |
| " " | | | @ | | | " " |
| TOTAL GROSS PREMS. | 3200 | 00 | | 760 | 00 | TOTAL GROSS COMS. |
| RETURN PREMIUMS PER ABSTRACT | | | | | | RETURN COMMISSIONS |
| | 50 | 00 | @ 15% | 7 | 50 | |
| | 25 | 00 | @ 20% | 5 | 00 | |
| | 15 | 00 | @ 25% | 3 | 75 | |
| | 75 | 00 | @ 30% | 22 | 50 | |
| | | | @ | | | |
| DEDUCT TOTAL RETURN PREMS. | 165 | 00 | | 38 | 75 | DEDUCT TOTAL RETURN COMS. |
| TO NET PREMIUMS | 3035 | 00 | | 721 | 25 | BY NET COMMISSIONS |
| TO BAL. DUE AGENT | | | | 2313 | 75 | BY BAL. DUE CO. |
| (MEMO. FOR CHGO. OFFICE ONLY) TOTAL DUE AGT. NEXT ACCT. | | | | | | (MEMO. FOR CHGO. OFFICE ONLY) BY BAL. DUE AGT. LAST ACCT. |
| (MEMO. FOR CHGO. OFFICE ONLY) BAL. DUE CO. LAST ACCT. | | | | | | (MEMO. FOR CHGO. OFFICE ONLY) BAL. DO CO. NEXT ACCT. |
| | | | | | | |
| TOTAL | 3035 | 00 | | 3035 | 00 | TOTAL |

WITNESSES
J. W. Angell
Charles O'Hill, Jr.

INVENTOR
Theodore C. Parsons
by Charles O'Hill
Atty.

Figures 3, 4:
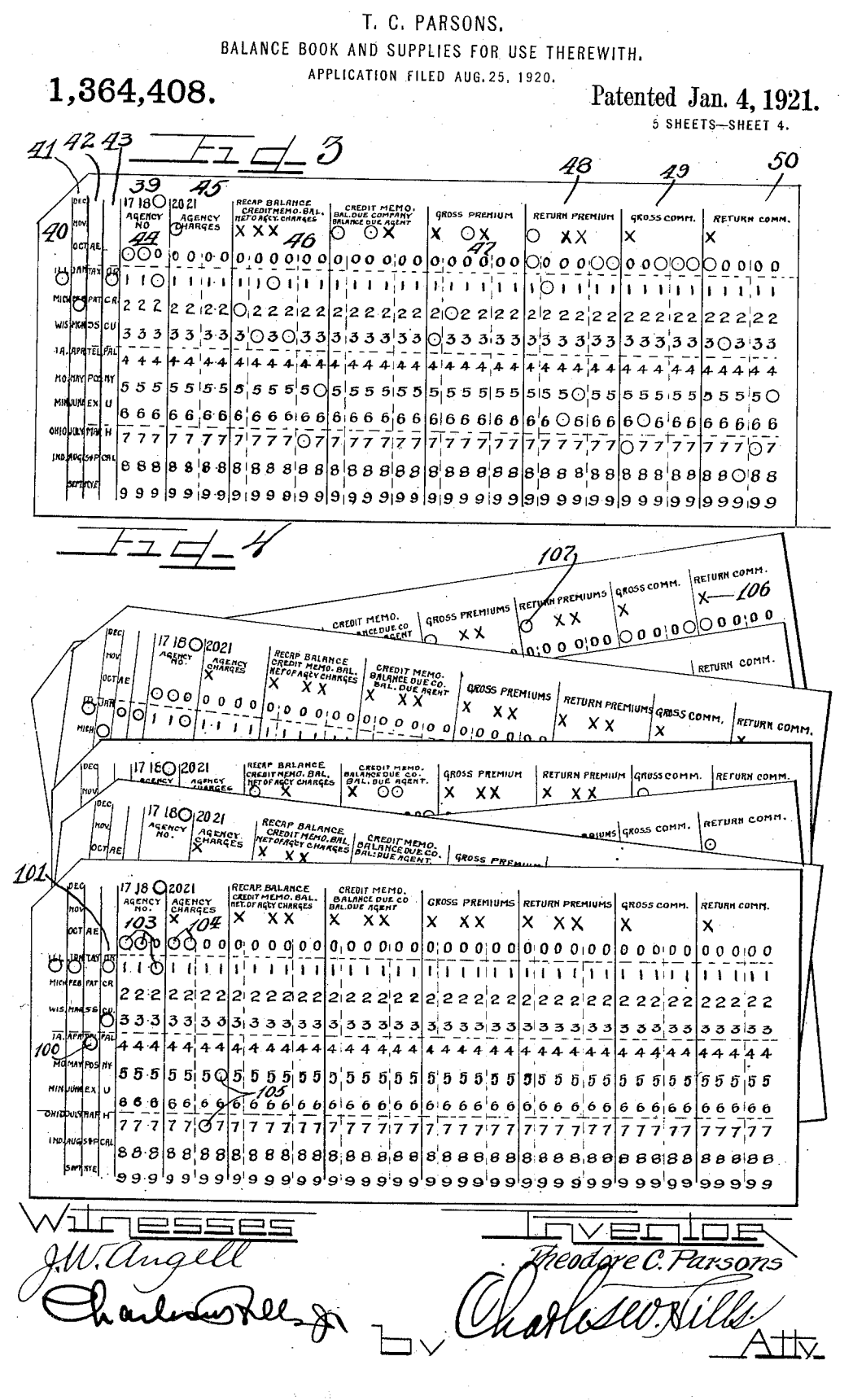

T. C. PARSONS.
BALANCE BOOK AND SUPPLIES FOR USE THEREWITH.
APPLICATION FILED AUG. 25, 1920.

1,364,408.

Patented Jan. 4, 1921.
5 SHEETS—SHEET 4.

T. C. PARSONS.
BALANCE BOOK AND SUPPLIES FOR USE THEREWITH.
APPLICATION FILED AUG. 25, 1920.

1,364,408.

Patented Jan. 4, 1921.

UNITED STATES PATENT OFFICE.

THEODORE C. PARSONS, OF OAK PARK, ILLINOIS.

BALANCE-BOOK AND SUPPLIES FOR USE THEREWITH.

1,364,408.  Specification of Letters Patent.  Patented Jan. 4, 1921.

Application filed August 25, 1920. Serial No. 405,912.

*To all whom it may concern:*

Be it known that I, THEODORE C. PARSONS, a citizen of the United States, residing at Oak Park, in the county of Cook and State of Illinois, have invented a new and useful Improvement in Balance-Books and Supplies for Use Therewith; and I do declare the following to be a full, clear, and exact description of said invention, such as will enable others skilled in the art to make, use, and practice the same.

This invention relates to a system of bookkeeping between a central concern and numerous agencies wherein bookkeeping machines and card counting and tabulating machines are employed. The present invention relates more particularly to the balance book and the way in which the tabulating machines are used to compute the balances entered therein.

It is an object of this invention to provide a balance book wherein the balances due month by month may be exhibited without the need of numerous itemizing journal columns heretofore used for the statement of the charges against the central concern by the several agencies.

It is a further object of my invention to render the page of the balance book smaller and more simple so that the balances shall be more conspicuously exhibited and more readily found.

It is a further object of my invention to so arrange the computation that as far as possible the work of tabulating machines in adding up the several items which enter into the balance may be substituted for clerical labor.

Another object of my invention is to dispense as far as possible with the use of manual computations in the finding of balances, not only the balances against the individual agencies but also the total balances for each State or other department of the business.

Another object of my invention is to exhibit in one book the agreement between the results obtained by the tabulating machines and the results obtained by the use of bookkeeping machines.

My invention may be most readily understood by reference to the accompanying drawings, wherein:

Figures 1 and 1ª together form a view of the sheet used by the central concern in rendering a balance and by the agent in stating his adjustment of the balance rendered by the central concern against him.

Fig. 2 is a view of the part of the sheet used by the central concern in rendering a balance against the agent, the sheet of which a part is illustrated in this figure being for a different month from that illustrated in Fig. 1.

Fig. 3 is a view of the card used with a computing machine for tabulating the results given upon the sheet shown in Fig. 2.

Fig. 4 is a view of a set of cards used with the tabulating machine for tabulating the items shown on the left hand part of Fig. 1.

Fig. 5 is a view of one sheet of the balance book.

In the system of accounting in which these blanks are to be used there is prepared at the central concern at the end of each month a statement such as is illustrated in Figs. 1 and 1ª. The right hand part of this sheet is filled out by the central concern and retained in its office; the left hand part is sent to the agent, who fills out thereon a statement of the items which require an adjustment of the balance rendered by the central concern. The agent then sends this left hand part to the central concern, where the total of the several items, not only on this sheet but on many similar sheets from other agents, are computed by a tabulating machine, by means of cards punched to show the same data as are shown on this sheet. At the end of the second month another statement is sent to the agent which the agent adjusts in its turn, and so on. The statement rendered by the central concern to the agent is called a recapitulation because it is a summary of the month's business as it appears on the books of the central concern. Fig. 2 shows the part of the second month's statement retained in the office of the central concern. The items upon this recapitulation have been computed from daily entries by means of a set of cards not illustrated in this case, because the invention to be protected by the patent sought in this application does not include the means for obtaining the totals which form the items on the recapitulation but concerns the means for dealing with these totals and with the adjustments supplied by the agent. The results upon recapitulations like that shown in Fig. 2 are then combined with the results of a tabulation of the data on sheets like the left hand part of Fig. 1. This tabulation is performed by means of cards like those shown in Figs. 3 and 4, and the results of this computation are entered in their proper places upon the sheet illustrated in Fig. 5.

Referring now to the drawings in detail: Figs. 1 and 1ᵃ give a view of the credit memorandum sheet used at the end of January. The right hand part 1 of this sheet shown in Fig. 1ᵃ is retained by the central concern, and the left hand side 2 shown in Fig. 1 is sent to the agent. In the case illustrated this is the agent at Chicago, Illinois, as indicated at 3, Fig. 1ᵃ. At 4 is the result of the finding of the balance due the company from the agent according to the books of the central concern, and this is copied at 5 upon the portion sent to the agent, the figures having a designation 6 to show that they are the balance. The designation also refers to the attached statement. This is not the right hand half of the same sheet but is another paper giving an itemized account of the month's business and which is not illustrated because its preparation and use form no part of the invention for which protection is here sought. This paper may include a carbon copy of the recapitulation shown in Fig. 1ᵃ.

The sheet has at its top a space 7 for the entry of the month. This entry is made with the sheet folded along the dotted line and carbon paper used to reproduce it so that the month is at the same time marked on the half 1 of the sheet. This mark does not show in Fig. 1ᵃ because it is on the opposite face of the sheet. Beneath this are the directions 8 to return the sheet to the central concern, while beneath this at 9 are directions for the use of the sheet. Beneath this is a set of columns with the title "Credit memo," and this sheet is on this account usually called the agent's credit memorandum sheet. The first of these columns 10 has a designation indicating that it is to receive the numbers of the policies concerning which the agent has done business during January and which do not appear upon the statement of the January business rendered the agent by the central concern. The next column 11 is for the date when the agent wrote or cancelled these policies. The next column 12 is for the gross return premiums or rebate, that is for the entry of sums that must be returned either because the policy has been cancelled or because it has been so changed that it requires a smaller premium. The next column 13 is for the statement of the rate at which the agent is entitled to commissions upon the premiums paid. The next column 14 is for the premiums paid upon the policies written. Space is provided at 15 for the total of column 12, and it has a designation to indicate this purpose. The space provided at 16 for the total of column 14 also has a suitable designation. Under the space 15 at 17 is a space with a designation for the insertion of the commissions upon the canceled policies with directions that these are to be subtracted. Under the space 16 is a space 18 with a designation to indicate that it is to receive the commissions upon the premiums written. The designation also indicates that this is to be subtracted from the premiums. At 19, to the right of the space 18, is a space for the entry of the difference obtained. Space 19 is directly under the space 5 and thus affords an easy arrangement for adding the entry at 19 to that at 5. There is a designation adjacent the space 19 to indicate that this addition should be done. At 20, at the right of space 17, is the place for the entry of the difference between the figures entered at 17 and those entered at 15. This space 20 is at the head of a column 20ᵃ of spaces each designated to indicate some item of a charge that the agent may have against the central concern. At 21 is a space for the footing of this column. This is under the space 19, and between the two is a space 22 for the entry of the sum of the figures in spaces 19 and 5. Beneath the space 21 are directions to indicate that the total found there is to be subtracted from the sum immediately above it, giving at 22ᵃ the agent's statement of the balance due the company as his books show it. Some of the items in the column underneath the space 20 may be matters wherein the company should receive a sum from the agent instead of the agent having a claim against the company. These are indicated by drawing a circle around the item in question, as shown at 23.

Each of the items in columns 12, 14 and 20ᵃ represents a transaction which is on the agent's books as having occurred in January but which was not reported to the central agency or for some other reason did not find its way onto their books until after the end of January. When, therefore, the items of business in question are reported to the central agency and are entered upon their books they will appear there as transactions in February. In making up their statements at the end of February the central concern will include those items as February business and they will form a part of the totals computed by the tabulating machines when preparing such statements. For this reason the statement rendered the agent at the end of February would not agree with the agent's books even if no transactions occurring in February remained unentered on the books of the central concern at the end of that month.

The result of the February business as shown by the tabulating machine working in the central concern's office is shown upon the recapitulation sheet, Fig. 2. This sheet has at 24 a space for the name of the agency, and at 25 a statement that it is a recapitulation. It contains at 26 a column suitably designated to show that it is for the gross premiums on business written, and at 27 a column suitably designated to show that it is for the commissions due the agent. The several items in these columns are designated by the rate of commission as is shown at 28. At 29 and 30 are designations to indicate the space for the total of the columns 26 and 27 respectively. At 31 and 32 are columns for the similar entries concerning the insurance canceled. At 33 is a column of designations for the several spaces in columns 31 and 32. These designations show the rate of per cent at which the commissions are to be computed. At 34 and 35 are spaces for the footings of columns 31 and 32 respectively. These total spaces are not directly under their columns but come under the spaces indicated by the designations 29 and 30, so that the difference between the gross premiums and the returned premiums and the difference between the gross commissions and the returned commissions can readily be computed. Directions for this computation are included in the designations for the spaces 34 and 35. The spaces for the entry of these differences is indicated by the designations 36 and 37, while the designation 38 shows the space wherein the final result of the computation giving the balance due to the company from the agent is entered. If the entry at 36 is smaller than that at 37 so that the final result is a balance due the agent instead of one due the company, the result is entered in a space to the left as indicated by the designation 38$^a$.

The data for the recapitulation sheets are obtained by using tabulating machines with a set of cards for writings and cancellations. These are similar to the cards mentioned above in describing the January recapitulation and are not illustrated in the drawings for the same reason. A card is punched to represent the information upon the recapitulation sheet. This is the card shown in Fig. 3. It contains at 39 a series of figures from which one may be punched to indicate the year. At 40 there is a column of designations to indicate the State; at 41 a column for the month; at 42 a column for the particular item for which the agent has expended money; at 43 a column for the name of the company whose business the agent has been doing. This column also contains the designations "Debtor" and "Creditor." A set of columns 44 is for the identification of the agency. A set of columns 45 marked "Agency charges" is not used when the card is being used for tabulating the results upon the recapitulation sheets. To enable the tabulating machine or the card punching machine to quickly pass over this set of columns, the X mark at the top of the left hand one of these columns is punched. The next set of columns 46 is for the entry of the balance. It will be seen upon inspection of the punch marks that they indicate $2,313.75, which agrees with the entry shown at 38 upon Fig. 2. The next set of columns is not used when the card is employed for the purpose now being described and the X mark at the top of the first of these columns has been punched for this reason. The next set of columns 47 is headed "Gross premium." It shows $3,200.00 to agree with the entry at 29. The next set of columns 48 is headed "Returned premiums" and shows $165.00 to agree with the entry at 34. The set of columns 49 is for the gross commission and shows $760.00 to agree with the entry at 30. The last set of columns 50 is for the returned commissions and shows $38.75 to agree with the entry at 35. These cards are supplied with designations to indicate the purpose of these several columns or sets of columns but these designations are not necessary to the practice of my invention as the operators who punch the cards know by heart the keys of the punching machine corresponding to any given data.

When the agent's credit memorandum sheet is received in the central office a set of cards are punched to indicate the entries thereon. These cards are shown in Fig. 4. The headings upon these cards are like the headings upon the card just described but the cards are of a different color to indicate that a different set of headings are to be considered. It will be noticed that some of the sets of columns have three headings. The use of a card of distinctive color indicates that the punch marks mean a sum designated by the first of these headings. When the card is not of this color one of the remaining two headings shows the meaning of the punch marks. Which one is to be regarded as significant is indicated by the punch mark in column 101. If the mark " Dr." is punched the debtor heading is the significant one but if " Cr." is punched the creditor heading gives the meaning of the punch marks. In the cards of the distinctive color the marks Dr. and Cr. are used to enable card sorting and tabulating machines to distinguish cases in which the balance is in favor of the company from those in which it is in favor of the agent.

A description of the meaning of the punch marks in one of these cards will suffice to show how all the data on Fig. 1 are reproduced on the cards because the same method is used for each item as for that shown in the instance described. For this purpose the charge of seventy-five cents for telegrams shown in column 20ª is selected. This is the item shown by the punch marks on the uppermost card in Fig. 4.

The punch marks for the State, year, month and company are self-explanatory. The punch mark 100 indicates that the charge was for telegrams. The punch mark 101 shows that it is a charge by the agent against the company. The punch marks 103 show that it concerns the business of agency number 1. The punch marks 104 show that the charge was less than one dollar and the punch marks 105 show that the amount is seventy-five cents. The marks X as shown at 106 are for convenience in using the card punching machines. When one of these is punched as shown at 107 it causes the machine to pass over several columns and thus relieves the operator from punching a repetition of zeros as was done at 104.

The balance book shown in Fig. 5 contains a column for the names of the agencies. This may be upon the sheet itself or an extra insert sheet used for this purpose, as shown at 51. Thus the drawing shows at 51ª that the Chicago agency or agency number 1 has its balances entered on the first set of lines. This column contains as shown at 52 the name of the State wherein the agencies recorded on this page are located, and at 53 the sheet has a space for the entry of the date. The part of the sheet to the right of the name column is separated by a line 54 into debtor and credit halves. The debtor half has at 55 a column headed "Total debits" and the credit half has at 56 a column headed "Total credits." There are columns for the cash sent to agents and for cash received from agents respectively, as shown at 57 and 58. At 59 and 60 there are columns for showing where in the cash book these cash transactions are entered. The remainder of the sheet is occupied by columns for the various balances, as indicated by the headings at 61 and 62. Each of these headings stands for several columns. The first column in each of the groups of balance columns is headed as shown at 63 and 64 by the word "Account." This column is to receive the number of the policy where a single policy is the subject of a separate entry, or if the entry is to stand for a monthly balance it is indicated by a numeral as shown at 65 to represent the month wherein the balance in question was rendered, the month being numbered instead of given the usual representation. The column 66 has the heading "Due company last account." The entry 66ª therein is copied from the preceding page and is the balance which is shown there as having been rendered. The column from which this was copied is the column on the preceding page like the column 67 and is indicated by the heading "Due company next account."

As the column 58 contains at 68 an entry showing that the balance has been paid, there is, in column 67 on the same line as the balance 66ª, no entry, showing that no balance is due for the month represented on this line. It will be observed that the payment shown at 68 is not equal to the balance shown at 66ª, but is equal instead to the corrected balance as computed by the agent and shown at 22ª in Fig. 1. This is characteristic of the balance book shown in this invention. The several balances are not computed upon the page, but are mere memorandums and the computation is done by the tabulating machines or bookkeeping machines, or both. The balance shown in column 67 is not the difference between the total debits and total credits but is computed as will be explained hereafter. It is the intention in this book not to combine into one figure the several balances arrived at at the end of each month but to keep each one separate so that it will be exhibited as a single and distinct balance until it has been disposed of by payment or other proceeding. This is particularly convenient in the insurance business, wherein although statements are rendered at the end of each month, the amount is not considered payable until a given period thereafter, this being the rule among insurance concerns.

The computation of the several items appearing on the balance sheet is as follows: To compute the total debits, the net premiums as shown in the February statement, Fig. 2, and given by the recapitulation card, Fig. 3, are added to the several items upon the agent's credit memorandum sheet Fig. 1 which show that money is due the agent from the company. This addition is not performed by hand, but is obtained by running the recapitulation card and the journal cards shown in Figs. 3 and 4 through the tabulating machine. The statement just made that the net premiums are given by the recapitulation card does not mean that the figures shown at 36 on Fig. 2 are repeated by punch marks on the recapitulation card but the figures at 29 and 34 are thus repeated and to add these figures on opposite sides of an account is equivalent to adding their difference on one side. The total credits is obtained in a similar manner. The net commissions in February as shown on the February statement and given by the recapitulation card are added to the several items on the credit memorandum sheet which show that the agent owes money to the company. This total is obtained by running the recapitulation cards and journal cards through the tabulating machine. The remark that the net commissions are given by the recapitulation card is subject to the same comment as that about the net premiums. The difference between these totals will not represent the actual balance due, but must be adjusted by the difference between the two sets of items upon the agent's credit memorandum sheet. When thus adjusted, it should agree with the balance due the company as obtained by the bookkeeping machine.

The computation just described is exhibited below.

| Dr. | | Cr. | |
|---|---|---|---|
| Prems. due Feb. from recap. card.......... | 3,035.00 | Com. in Feb. as shown by recap. card............. | 721.25 |
| Ret. prems. Jan. cr. memo ................ | 75.00 | Ret. commission Jan. cr. memo ......... | 18.75 |
| Underpayment....... | 4.75 | Overpayment ....... | 2.25 |
| Taxes ............... | 100.00 | Premiums.......... | 55.00 |
| Patrols and salvage... | 25.00 | | |
| Telegrams ............ | .75 | | |
| Postage.............. | 10.00 | | 797.25 |
| Exchange ............ | .25 | Difference .......... | 2,480.00 |
| Stationery and printing ................ | 14.00 | | 3,277.25 |
| Commissions......... | 12.50 | | |
| | 3,277.25 | | |

| | | | |
|---|---|---|---|
| Difference brought over ............... | 2,480.00 | Cr. memo dr. items.. | 242.25 |
| Cr. memo. cr. items .. | 76.00 | Difference .......... | 2,313.75 |
| | 2,556.00 | | 2,556.00 |

Balance due Co., $2,313.75.

On the left hand side of this computation the first item comes from 36 on Fig. 2 and the next item from 15, Fig. 1. The next seven items are from column 20ª, Fig. 1 and the next from 18, Fig. 1. On the right hand side the first item comes from 37, Fig. 2, and the next from 17, Fig. 1. The next is the encircled item from column 20ª, Fig. 1, and the next comes from 16, Fig. 1. The last item on the left hand side is the sum of the items from Fig. 1 on the right hand side and the last item on the right hand side is the sum of the items from Fig. 1 on the left hand side.

As the additions here indicated are all performed by the tabulating machines working on punched cards it is evident that the actual labor of finding the balance is reduced.

In preparing the illustration of the balance book, it is assumed that the agent paid on the 20th of February the amount needed to settle the January balance. This amount may be computed by subtracting from the amount stated by the company to the agent on the January recapitulation, as given at 66ª, the difference between the two sets of items from the credit memorandum sheet. The result is shown at 68, and will of course agree with the result computed by the agent which is shown at 22ª on Fig. 1. In the line opposite the entry 66ª there is in the column 67 no entry, indicating thereby that the January balance has been paid. The entry on the second line in column 67 would be copied into the column 66 upon the sheet of the balance book for March. The computation of the balance due the company described above may seem needlessly involved, but it possesses the advantage that machines may be used for the laborious addition, leaving only few and short problems in subtraction to be done by hand or by comptometer operators. This advantage may not be obvious in considering the account with a single agency, but in finding the totals for all the agencies within a State, or for all the agencies with which the central concern does business, the saving is very considerable.

In the prior art a sheet known as the "Agency journal" served a purpose somewhat similar to this balance book sheet. The sheet contained, between the columns like those separated by line 54 in the book here shown, a large number of columns in which it was necessary to enter the several items now added by means of the tabulating machine. These columns contained headings similar to the headings now given for the several spaces upon the agent's credit memorandum sheet. The agency journal sheet also contained, to the left of the column like that shown at 55, a number of columns in which items now shown upon the recapitulation were entered. These extra columns used upon the agency journal sheet were necessary to compute the balances as the computation was obliged to appear upon the face of the agency journal sheet. As the present balance book sheet is a mere memorandum of results and the computation is done by the tabulating machines, there is no need for such columns on the present sheet.

I do not wish to confine myself to the exact system of columns and designations shown upon this balance book sheet or upon the several cards illustrated, or upon the credit memorandum and recapitulation sheets, but any variation in the details of these matters which comes within the spirit of my invention is intended to be covered by the claims.

I claim as my invention:

1. In combination a set of cards of suitable shape and size for use with card punching, sorting and tabulating machines and bearing suitable indicia to show that the items punched thereon are matters of business between a central concern and an agency and other designations to indicate that the items punched are a recapitulation of said items, one of said cards being of a different color from the others, a blank with suitably designated spaces for the entry of said items of business, a second blank with suitably designated spaces for the recapitulation of said items, and a third blank ruled into columns suitably designated to receive the results from the tabulating machine when it has operated upon said cards, said columns, together with the designations thereof and of the spaces of each column occupying substantially the whole of said third blank whereby the size of said blank is reduced and the balances due are exhibited apart from the statement of the items entering into said balances.

2. In combination a set of cards of suitable shape and size for use with card punching, sorting and tabulating machines and a blank having columns suitably designated to receive the results of the computations performed by said tabulating machines, the several lines of said blank having designations to indicate the class of data entering into the computation of the results entered on that line in the several columns, places on said cards suitably designated to receive punch marks indicating the class of data represented by said card, whereby the cards when punched will coöperate with the sorting machines to bring together the data for the computations whose results should be entered on the same line of said blank.

3. In combination a sheet containing a suitably designated space for the statement of the balances due from an agent to a central concern as shown on the books of the central concern for one month, and suitably designated spaces for items on the agent's books for said month that reconcile said statement with the balance as given by the agent's books for said month, a sheet containing spaces suitably designated for a recapitulation of the business between said central concern and said agent for the next month, a card of a shape and size to coöperate with card sorting and tabulating machines and having places for punch marks so located that they will coöperate with said machines to cause a tabulation of the data on said recapitulation sheet, a set of cards similarly adapted to cause a tabulation of the data reconciling the agent's and the central concern's books for the first month and a sheet containing columns suitably designated to receive the results computed by means of the tabulating machines, said columns occupying the major portion of said sheet.

In testimony whereof I have hereunto subscribed my name in the presence of two subscribing witnesses.

THEODORE C. PARSONS.

Witnesses:
FRED E. PAESLER,
W. H. WHITTEN, Jr.